(12) United States Patent
Reisch et al.

(10) Patent No.: US 7,479,720 B2
(45) Date of Patent: Jan. 20, 2009

(54) SEAL FOR AN ELECTRIC MACHINE LOCATED WITHIN A DRIVE TRAIN OF A MOTOR VEHICLE

(75) Inventors: Matthias Reisch, Ravensburg (DE);
Maik Würthner, Friedrichshafen (DE);
Axel Heitmann, Ingolstadt (DE); Stefan Kilian, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 472 days.

(21) Appl. No.: 10/558,168

(22) PCT Filed: May 18, 2004

(86) PCT No.: PCT/EP2004/005330

§ 371 (c)(1),
(2), (4) Date: Dec. 20, 2005

(87) PCT Pub. No.: WO2004/104454

PCT Pub. Date: Dec. 2, 2004

(65) Prior Publication Data

US 2006/0244325 A1  Nov. 2, 2006

(30) Foreign Application Priority Data

May 23, 2003  (DE) .............................. 103 23 253

(51) Int. Cl.
*H02K 7/08* (2006.01)

(52) U.S. Cl. .............................. 310/88; 310/92; 310/86
(58) Field of Classification Search .................. 310/85,
310/86, 88, 76–78, 61–63, 90, 92
See application file for complete search history.

(56) References Cited

U.S. PATENT DOCUMENTS

| 2,418,707 | A |   | 4/1947 | Groot |
| 2,898,132 | A |   | 8/1959 | Guérin |
| 3,038,733 | A |   | 6/1962 | Hudson et al. |
| 4,697,978 | A | * | 10/1987 | Tada et al. ..................... 310/86 |
| 5,708,539 | A | * | 1/1998 | Schuh ..................... 360/97.03 |
| 5,980,115 | A |   | 11/1999 | Hoeting |
| 6,184,599 | B1 | * | 2/2001 | Okabe et al. .................. 310/64 |
| 6,705,416 | B1 |   | 3/2004 | Glonner et al. |

FOREIGN PATENT DOCUMENTS

| DE | 199 17 665 A1 | 10/2000 |
| DE | 101 15 504 | 10/2002 |

* cited by examiner

*Primary Examiner*—Dang D Le
(74) *Attorney, Agent, or Firm*—Davis & Bujold, P.L.L.C.

(57) ABSTRACT

A seal of an electric machine installed within a motor vehicle drive mechanism with of one of a wet-running oil-cooled disk gearshift element, a multiple disk clutch and a multiple disk brake being accommodated within a free space of a rotor of the electric machine. An oil free annular gap (3) is formed between the rotor (2) and the stator (1) of the electric machine and the annular gap (3) has a seal (9) which, at a high rate of rotation by the rotor (2) and depending on the type of gap seal, seals without touching.

7 Claims, 1 Drawing Sheet

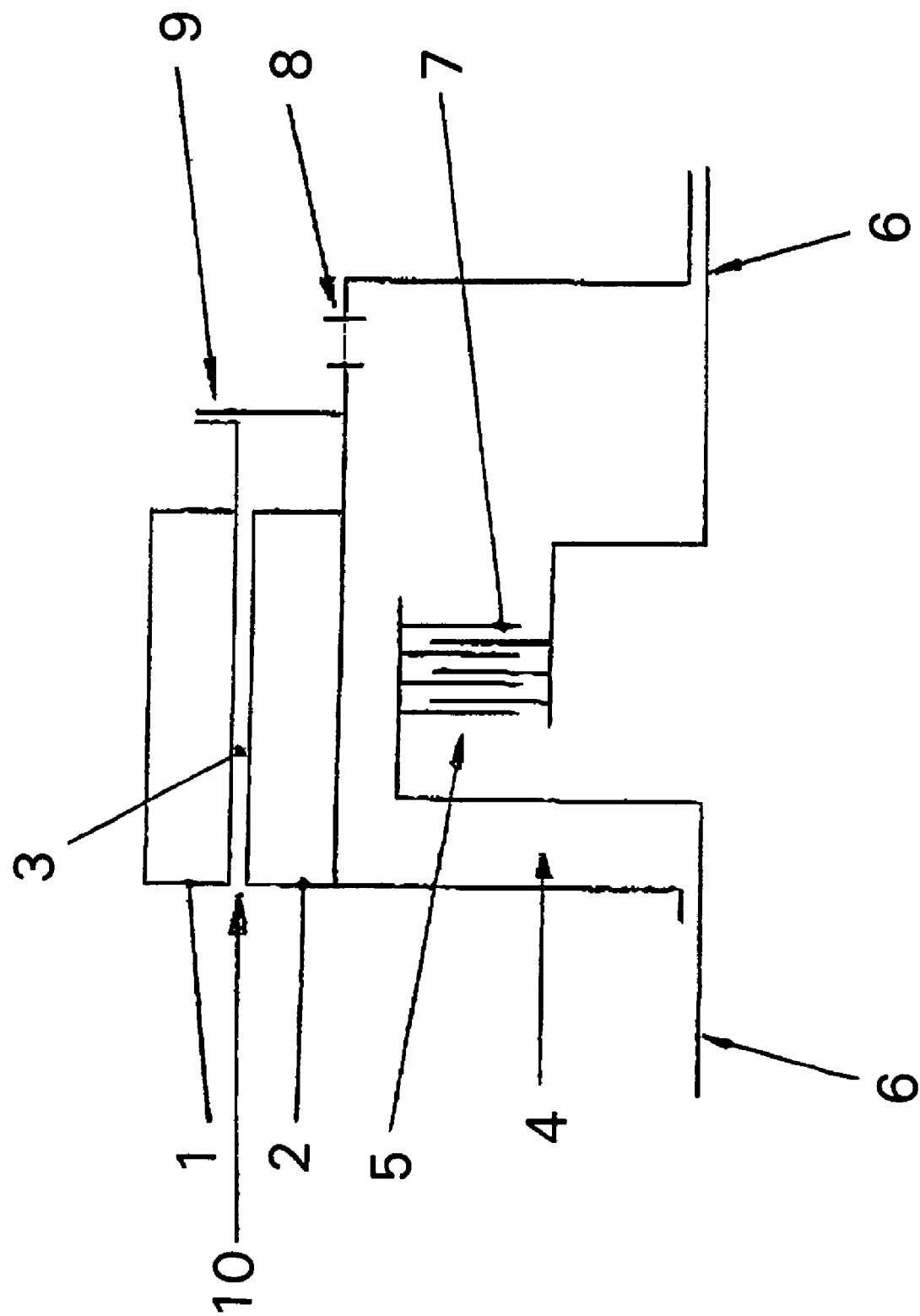

SEAL FOR AN ELECTRIC MACHINE LOCATED WITHIN A DRIVE TRAIN OF A MOTOR VEHICLE

This application is a national stage completion of PCT/EP2004/005330 filed May 18, 2004 which claims priority from German Application Serial No. 103 23 253.2 filed May 23, 2003.

FIELD OF THE INVENTION

The invention relates to a seal for an electric motor installed within a motor vehicle drive mechanism.

BACKGROUND OF THE INVENTION

Known already for some time now is a drive system for motor vehicles which, in addition to a conventional combustion engine, also has an electric motor that is integrated into the drive mechanism of the motor vehicle either alternatively or also concurrently. These drive systems, known as "hybrid drives", have many advantages from the ecological point of view, since the mixed type of drive mechanism can also achieve significant savings in energy in mixed driving (city/country) when compared to an exclusively combustion engine drive.

Such hybrid drives for motor vehicles have been disclosed in DE 199 17 665 A1, which has a first electric motor located within the drive mechanism between the combustion engine and the vehicle drive mechanism and a second electric motor permanently linked to a transmission drive shaft. Additionally, a gearshifting clutch is located between the electric motor and the combustion engine operating as a motor and as a generator.

In practice, the axial construction length of the motor vehicle drive mechanism, especially in the front traverse arrangement, plays a significant role. In order to achieve an especially short drive design, it has been shown to be useful to take advantage of the free construction space within the rotor of the electric machine. In this respect, it is know that at least one coupling of the drive system could be used there whereby, preferably a wet-running or, as the case may be, oil-cooled multiple disk clutch can be inserted.

Nevertheless it has shown to be disadvantageous when an annular gap between the rotor and the stator of an electric motor which, as such should remain free of oil, is used with the above noted cooling oil, since the centrifugal force created radially pushes the oil outward through the disks of the multiple disk clutch and is returned in a large diameter back to the crankcase sump. In the studies completed with such diameters, and based on the usual number of revolutions, or because of the high rate of rotation of the motor vehicle's drive mechanism or, as the case may be, its peripheral velocity affecting the seals, these have not been shown to be useful for the annular gap, since they are subjected to a relatively high rate of wear and tear. Here is where the invention described in the following text enters the picture.

The purpose of the invention is to provide a relatively abrasion-free seal for an electric machine or motor that is inserted within the motor vehicle drive mechanism. A wet-running oil cooled gearshift element, for example, a multiple disk clutch, being accommodated within a free construction space of a rotor of the electric machine with which an annular gap, free of oil to the highest degree possible, between the rotor and the stator of an electric machine is practicable.

According to the invention, this task together is solved in that in order to achieve the highest possible level oil-free annular gap between the rotor and the stator of the electric motor, at least one lining is to be arranged at the front-facing side of the annular gap, which for its part, is designed to seal, at least at high rate of rotation by the rotor, without touching.

According to an advantageous design of the invention, the lining is fashioned in such way and arranged on the rotor so that at a standstill or at a low rate of rotation it seals the annular gap by being in contact and that at a high rate of rotation, it is released from the annular gap.

Furthermore, it is recommended, in the sense of the invention, that the lining be formed through a more or less familiar V-ring.

Additionally, it is foreseen that the annular gap, preferably at the location of the lining that is on the opposite side of the electric machine, be linked to an air intake opening.

Finally, it is recommended that the air intake opening be connected through a vent pipe with the interior of the motor vehicle drive mechanism that is linked to the vehicle transmission.

SUMMARY OF THE INVENTION

According to the invention, the seal of the electric motor that is attached within a motor vehicle drive mechanism to a radial of the wet running gearshift element placed within the free construction space of the electric motor rotor gear as, for example, a multiple disk clutch or a multi-disk brake which provides, first of all, in view of the state of the art of technology, for a significant advantage in that the penetrating oil will already be carried away from it into the annular gap. Furthermore, this seal is simple to engineer and is judged to cause especially little abrasion. By using the measures according to the invention, the electric motor will remain functional for a longer period of time so that it can remain at a standstill for longer periods of time. In addition, the working life of the oil is increased, since in a hot annual gap, the oil will be damaged.

Moreover, because of the low rate of abrasion, the use of a V-ring would have hardly any negative affect on the electric motor torque. The special construction of the V-ring has the effect that with a minimum of loss in performance it falls back even more with the increasing rate of rotation. Also, such a V-ring at a standstill can effectively prevent penetration of oil into the annular gap.

BRIEF DESCRIPTION OF THE DRAWING

The invention will now be described, by way of example, with reference to the accompanying drawing in which:

The sole FIGURE shows a schematic of a partial lengthwise section of an electric motor arranged within a motor vehicle drive mechanism.

DETAILED DESCRIPTION OF THE INVENTION

There follows the well-known electric machine or motor arrangement, which can be used as either a drive motor or as a generator, and which consists of a stator 1 and a turning rotor 2 placed in it with an annular gap 3 pictured between them.

Arranged within a free construction space 4 of the rotor 2 is a gear clutch in the form of a wet-running or, as the case may be, an oil-cooled multiple clutch disk 5, which is connected to a function-linked motor vehicle drive mechanism 6. In place of a multiple disk clutch, a multiple disk brake can also be used.

During the operation of the multiple disk clutch 5, oil will be needed to cool it which, as explained above, flows from a crankcase sump (not represented here), and is taken up by disks 7 of the multiple disk clutch 5 and, because of the centrifugal force, flows out again in the same radial path. Subsequently, the cooling fluid flows through a cooling oil drain 8 in a large diameter back into the crankcase sump.

During the earlier explained oil cooling, unintentional oil penetration can occur into the annular gap 3, which may be damaging to the function and the life span of the electric machine or motor.

In order to counter this problem, that is to say, to largely prevent oil penetration into the annual gap 3 during the operation of the electric machine or motor or to push it out as fast as possible, the invention provides at the front-facing side of the annular gap 3 for at least one lining 9 which, for its part, at least at a high rate of revolution by the rotor 2, depending on the type of the gap seal, has been designed to seal without touching.

In terms of its function, the gap seal is such that, as soon as the electric machine or, as the case may be, its rotor 2 is turning, the oil located in the annular gap 3 moves out of the annular gap 3 as a result of the effect of centrifugal forces. Further, the turning of the rotor 2 generates an air stream which also prevents the penetration of oil from the outside into the annular seal 3.

In order to advantageously support the removal of oil from the annular gap 3, according to a preferred design of this invention, an air intake opening 10 is indicated, which can be included at the front-facing side of the electric machine located opposite the lining 9, from where a further reinforced air flow within the annular gap 3 drives out the oil, and also in the area of the lining 9 (the gap lining) prevents the penetration of the oil from the outside into the annular gap 3 as soon as low rates of rotation of the rotor 2 occur.

It has been proved to be advantageous to link the air intake opening 10 through a vent pipe with the drive interior of a motor vehicle drive mechanism-connected vehicle transmission.

Additionally, under certain circumstances, oil penetration into the annular gap 3 can also occur in the case of an electric machine or motor being at a standstill or, as the case may be, at the stopped multiple disk clutch 5 and the corresponding skewed transmission position.

In order to counter such a nuisance, the lining 9 is advantageously designed and placed on the rotor 2 so that it will seal the annular gap 3 even at a standstill or at a low rate of rotation while touching, and at a high rate of rotation will release the annular gap 3 so that a maximally effective the gap seal can be developed.

The already-known V-ring (as diagrammatically shown in the sole FIGURE) has proven itself as especially suitable for the design of a lining 9 such as that described, and its advantages have been described in greater detail above.

REFERENCE NUMERALS

1 stator
2 rotor
3 annular gap
4 construction space
5 multiple disk clutch
6 motor vehicle drive mechanism
7 disks
8 cooling oil drainage
9 lining
10 air intake opening

The invention claimed is:

1. A seal of an electric machine installed within a motor vehicle drive mechanism with of one of a wet-running oil-cooled disk gearshift element, a multiple disk clutch and a multiple disk brake being accommodated within a free construction space of a rotor of the electric machine, the seal comprising: to achieve a very high degree of oil-free annular gap (3) between the rotor (2) and a stator (1) of the electric machine at a face side of an electric machine annular gap (3), at least one lining (9) is fixed to the rotor (2) adjacent an end of the annular gap (3), such that the lining (9) at least partially encloses and seals the annular gap(3), the rotor (2) is located within the stator(1) such that rotation of the rotor (2) centrifugally directs oil within the annular gap (3) radially outward past the at least one lining (9) and rotation of the rotor draws a flow of air into the annular gap (3) which flows towards the lining (9) and prevents fluid from entering the annular gap (3).

2. The seal according to claim 1, wherein the lining (9) is designed in such way and arranged on the rotor (2), that during one of a standstill or at a low rate of rotation speed, the lining seals the annular gap (3) by touching, and at a high rate of rotation speed, the lining (9) at least partially opens the annular gap (3).

3. The seal according to either claim 1, wherein the lining (9) comprises V-ring.

4. The seal according to claims 1, wherein the annular gap (3) extends between the rotor and the stator and includes an air intake opening (10), on a side of the electric machine opposite the lining (9), which facilitates passage of air therethrough.

5. The seal according to claims 1, wherein the electric machine and seal being located in a hybrid drive adjacent a drive motor, and a flow of air is drawn into the annular gap (3) and flows towards the lining (9) to prevent fluid from entering the annular gap (3).

6. An electric machine and seal for a drive train of a motor vehicle, the electric machine and seal comprising:
a stator and an adjacent rotor, each extending along an axis about which the rotor rotates, the stator and the rotor, which is located radially within the stator, are arranged a distance from the axis such that a free space is formed radially inside the rotor which accommodates one of an oil-cooled disk gearshift element, a multi-disk clutch and a multi-disk brake;
an annular gap axially extends between the stator and the rotor and a first end of the annular gap has an air intake opening; and
a lining is arranged adjacent an opposed second end of the annular gap for sealing the second end and preventing fluid from entering the annular gap, the lining at least partially opens the second end of the annular gap, upon rotation of the rotor, to draw a flow of air into the annular gap. through the air intake opening, and direct the flow of air towards the opposed second end, and the flow of air exiting the annular gap past the lining at the second end prevents fluid from entering the annular gap.

7. An electric machine and seal for a drive train of a motor vehicle, the electric machine and seal being located in a hybrid drive adjacent a drive motor, the electric machine and seal comprising:
a stator surrounding a rotating rotor, and the rotor forming a radially inner free space which accommodates one of one of an oil-cooled disk gearshift element, a multi-disk clutch and a multi-disk brake;
an annular gap being formed between the stator and the rotor and a first end of the annular gap comprising an air intake opening; and a lining is arranged adjacent an opposed second end of the annular gap for sealing the second end of the annular gap and preventing fluid from entering the annular gap, the lining at least partially opens the second end of the annular gap, upon rotation of the rotor, to facilitate drawing of a flow of air into the annular gap, through the air intake opening, and allowing the flow of air towards the opposed second end such that the flow of air exiting the annular gap, past the lining at the second end, prevents fluid from entering the annular gap.

* * * * *